United States Patent [19]

Romey et al.

[11] 4,414,344
[45] Nov. 8, 1983

[54] MODIFIED SYNTHETIC PLASTIC FROM THERMOPLASTIC SYNTHETICS AND COAL HYDROGENATION RESIDUES

[75] Inventors: Ingo Romey, Hünxe, Fed. Rep. of Germany; Menachem El-Roy, Haifa, Israel

[73] Assignee: Bergwerksverband GmbH, Essen, Fed. Rep. of Germany

[21] Appl. No.: 348,451

[22] Filed: Feb. 12, 1982

Related U.S. Application Data

[63] Continuation of Ser. No. 75,741, Oct. 29, 1979, abandoned.

[30] Foreign Application Priority Data

Nov. 19, 1978 [DE] Fed. Rep. of Germany ....... 2839377

[51] Int. Cl.$^3$ .............................................. C08L 95/00
[52] U.S. Cl. ........................................ 524/65; 524/13
[58] Field of Search .................................... 524/13, 65

[56] References Cited

U.S. PATENT DOCUMENTS 4,204,986  5/1980  Romey et al. ..................... 524/13

*Primary Examiner*—Melvyn I. Marquis
*Attorney, Agent, or Firm*—Michael J. Striker

[57] ABSTRACT

Synthetic plastic materials for the manufacture of extrusion, injection and press forms are described, which are prepared from elastomers as well as mixed- and copolymers thereof with thermoplastic properties and liquification products from extractive coal hydrogenation which are residues with a softening point between 50° and 150° C. Polar, aromatic or cyclic groups in the elastomer component increase the compatibility of the coal liquification residue with the elastomer and improve the mechanical properties of the products.

7 Claims, No Drawings

MODIFIED SYNTHETIC PLASTIC FROM THERMOPLASTIC SYNTHETICS AND COAL HYDROGENATION RESIDUES

This is a continuation of application Ser. No. 075,741, filed Oct. 29, 1979 and now abandoned.

BACKGROUND OF THE INVENTION

The invention concerns modified synthetic plastic materials, which are derived from elastomers as well as mixed- and copolymers thereof with thermoplastic properties and from liquification products from coal as well as, if desired, customary filler materials.

Synthetic plastic materials of this type are used principally for the manufacture of extrusion, injection and press forms. These are used in e.g. the construction and installation sector for sealing and protection purposes, for example as foils for sealing against water.

For such purposes a large number of synthetic plastic mixtures are known, which are principally comprised of ethylene-copolymerisates as plastic component and with known bitumina of a tar basis.

From U.S. Pat. No. 3,249,567 are known mixtures of about 4 to 95 weight-% aromatic asphalts from petroleum and about 5 to 95 weight-% ethylene-copolymerisates with a 10 to 40 weight-% portion of acrylic acid ester, calculated from the weight of the copolymerisates. Test samples from such mixtures achieve tear resistances up to about 4.5 N/mm$^2$ and tear elongations up to about 900%.

From DE-AS No. 24 41 403 molded articles are known which are essentially ethylene-copolymerisates and bitumen, in which the bitumen is an extract and/or precipitate which according to German technical specification DIN 1995 has a penetration at 25° C. which is smaller than 10. Test bodies of such mixtures have tear resistances up to about 8 N/mm$^2$ and tear elongations up to about 1100%.

Building sheets are known from DE-PS No. 19 48 526, which are about 45 to 50 weight-% a mixture of polyethyleneacrylic acid ester copolymerisate and a small amount of bitumen, about 10 to 15 weight-% high-pressure polyethylene as well as about 40 weight-% anthracite dust with a grain size up to 30μ and up to 30 weight-% uncombustible residue, calculated from the anthracite dust component. Depending upon the preparative method, tear resistances between 2 and 5 N/mm$^2$ and tear elongations between 300 and 1000% are achieved.

Finally, in the German application P 28 01 154.3 mixtures are described of 30 to 90 weight-% thermoplastic synthetic materials, in particular polyolefins and copolymers thereof as well as, if desired, up to 25 weight-% elastomers with thermoplastic properties, and of 20 to 60 weight-% of a product from the liquification of coal which boils above 350° C. at normal pressure, as well as filler material, if desired. Tear resistances from 4 to 26 N/mm$^2$ and tear elongations from 10 to 660% are achieved.

With this mixture of German application No. P 28 01 154.3 it is particularly important that all components from the liquefaction of coal with a boiling point at normal pressure below 350° C. are removed before mixing with the synthetic plastic at an operating temperature between 150° and 250° C. Thus, the mixtures contain only high-melting residues from coal hydrogenation. In addition, the mixture with 30–90 weight-% calculated from the mixture has a high synthetic plastic component. The residue is here merely an extender for the synthetic plastic component.

DESCRIPTION OF THE INVENTION

It is a goal of the invention to increase the component of residue from coal hydrogenation and thereby also the total amount of solid ballast material from coal hydrogenation and customary filler material as much as possible.

This is achieved through the invention by using as liquification product a residue from extractive coal hydrogenation with a softening point between about 50° and 150° C. according to German technical specification DIN 1995.

Further aspects of preferred embodiments of the invention include the following:

(a) higher melting residues are mixed with softeners, in particular with a mineral oil or an aryl ester;

(b) the residue from the coal hydrogenation and customary filler materials together are from 40 to 80 weight-% of the total mass;

(c) the residue from the coal hydrogenation constitutes between 50 to 70 weight-% of the weight of the filler-free synthetic material;

(d) the elastomer component is between about 20 to 40 weight-% of the total weight;

(e) the residue from the coal hydrogenation is freed from solid, non-melting components;

(f) the elastomeric component includes if desired partially cross-linked co- or mixed polymers, which have one or more active groups with polar, aromatic or cyclic properties; and (g) the elastomer-component consists of one or a mixture of many polymers.

The coal, for example, is liquified at high pressures from between 100 to 700 bar and at temperatures from between 400° and 500° C., generally in the presence of a catalyst. As a rule, the coal is ground to finer than 200μ and mixed with a heavy oil. According to the type of residue from the coal hydrogenation which is desired, more or less hydrogen, either in gaseous form or in the form of a hydrogen-providing heavy oil, is added. The more hydrogen used, the more low-boiling residue from the coal liquification is produced. The range of products obtained encompasses a wide variety of different hydrocarbons with increasing boiling point, generally starting with methane and through low- to high-boiling oils as well as insoluble coal components and minerals (ash). Known coal hydrogenation processes include the Bergius-Pier process and the Pott-Broche process.

It has now been surprisingly found that the residue with a softening point between 50°–150° C. from the liquification of coal is advantageously used as a component for the synthetic plastic materials described above. In addition, the residue can be mixed at a preparative temperature between about 90° to 160° C. in amounts up to 70 weight-%, calculated from the total weight, with mixed or copolymerisates of or non cross-linked elastomers. This depends upon the presence of polar, aromatic or cyclic (e.g., terpene) components in the synthetic plastic component. These active components increase the compatibility of the synthetic plastics with the residue from the coal hydrogenation as well as the compatibility of the filler material and the mechanical properties of the products.

Such active components include acrylonitrile polymerisate (NBR) with about 39% acrylonitrile content (AN), butadiene-styrene copolymerisate (SBR) with about 23.5–30% styrene content, ethylidene-norbornene copolymerisate (EPDM/EN) with a Mooney viscosity ML 4 (100° C.) between 45–85, vinyl acetate copolymerisate with 12–30% vinyl acetate content (VA) and a softening point from 72°–100° C. as well as vinyl chloride copolymerisate with vinyl acetate or acrylonitrile.

It has also been found that with an increase of the polar, aromatic or cyclic component up to 30 weight-% of the synthetic plastic component, the weight component of the residue in the total mixture can be raised to 35–70%. At the same time, the filler material can be reduced from 40 to 0 weight-%. The following dependencies have been established:

(a) With a reduction in the softening point of the residue, more residue can be worked into the mixture at a constant filler material component. This increases the tear elongation.

(b) With an increase in the softening point of the residue the tear resistance increases and the tear elongation decreases.

(c) With a reduction in the degree of polymerization of the synthetic plastic material or its softening point, a smaller component of polar, aromatic or cyclic groups in the synthetic plastic component is necessary, in order to achieve the same compatibility and mechanical values.

(d) With the amount of polar, aromatic or cyclic components in the synthetic plastic material the tear resistance decreases and the tear elongation increases with constant filler material component.

Depending upon the component of residue from the coal hydrogenation with a softening point between 50° and 150° C. of solid ballast material, i.e., undissolved coal components, minerals and in some cases catalyst, the addition of customary filler materials, such as soot, anthracite dust, chalk and ground stone, is possible. Solid ballast material and filler material should not constitute more than about 50 weight-% in total of the synthetic plastic material.

The removal of solid ballast materials from the inventive residue from coal hydrogenation may be desired for synthetic plastic materials with particularly high requirements. The separation can be carried out in conventional manner, such as pressure filtration.

The manufacture or preparation of form bodies, foils, etc. is also carried out conventionally, such as mixing and kneading of the mixture components at temperatures between 90° and 160° C. and a final treatment in most cases in extruders and injection molding machines.

The invention may be better understood through the following examples.

EXAMPLE 1

Modified Synthetic Plastic Material for Foils

A 15.4 weight portion of acrylonitrile-butadiene copolymerisate with 39% acrylonitrile content (NBR) and a 4.0 weight portion vinyl acetate copolymerisate with a Mooney viscosity ML 4 (100° C.) of 65±7 and about 15% vinyl acetate (VA) and a softening point of 90°–96° C. according to German technical specification DIN 1995, 3.8 weight portion butadiene-styrene copolymerisate with a 23.5% styrene content (SBR), 50.6 weight portion residue from coal hydrogenation with 16.5% solid, non-melting material and a softening point of 54° C. according to German technical specification DIN 1995 and 26.2 weight portion anthracite dust is mixed in an intensive mixer or pressure kneader at 135° C. (kneaded, rolled or extruded).

A foil from this synthetic plastic mixture has a tear resistance of 3.0 N/mm$^2$ and a tear elongation (at 23° C.) of 600%.

EXAMPLE 2

Synthetic Plastic Material for Injection Molding 35 weight portion acrylonitrile-butadiene copolymerisate with 39% acrylonitrile content (NBR) and a Mooney viscosity ML 4 (100° C.) of 65±7 and 65 weight portion filtered residue from coal hydrogenation with a softening point of 129° C. according to DIN 1995 is mixed (kneaded) and granulated at 150° C. in an intensive mixer or pressure kneader.

A form body from this injection molding mixture has a tear resistance of 16.2 N/mm$^2$ and a tear elongation (at 23° C.) of 580%.

EXAMPLE 3

Modified Synthetic Plastic Material for Extrusion Parts 23 weight portion acrylonitrile-butadiene copolymerisate with 39% acrylonitrile content (NBR) and a Mooney viscosity ML 4 (100° C.) of 65±7, 37 weight portions filtered residue from coal hydrogenation with a softening point of 129° C. according to DIN 1995 and 40 weight portions anthracite powder are kneaded and extruded in a pressure kneader at 150° C. A foil from this synthetic plastic mixture has a tear resistance of 10.0 N/mm$^2$ and a tear elongation (at 23° C.) of 220%.

EXAMPLE 4

Modified Synthetic Plastic Materials for Foils 30 weight portions butadiene-styrene copolymerisate with 30% styrene content, 30 weight portions of a residue from coal hydrogenation with 29% solid, non-melting materials and a softening point of 129° C. according to DIN 1995, 10 weight portions heavy oil distillate from coal hydrogenation with a boiling point of 350° C. at normal pressure and 30 weight portions anthracite powder are kneaded in a pressure kneader at 150° C.

A foil from the synthetic plastic material has a tear resistance of 2.8 N/mm$^2$ and a tear elongation (at 23° C.) of 140%.

EXAMPLE 5

Synthetic Plastic Materials from Surrounding Conduits 32 weight portions acrylonitrile-butadiene copolymerisate with 39% acrylonitrile content and a Mooney viscosity ML 4 (100° C.) of 65±7, 53.6 weight parts of residue from coal hydrogenation with 12% non-melting substances and a softening point of 76° C. according to DIN 1995 and 14.4 weight parts anthracite dust are mixed in a pressure kneader at 150° C.

A foil from this synthetic plastic material has a tear resistance of 3.9 N/mm$^2$ and a tear elongation (at 23° C.) of 1000%.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A synthetic plastic composition comprising a mixture of
   (1) at least one elastomeric compound having thermoplastic properties and containing at least one polar, aromatic or cyclic group, and
   (2) 50 to 70 weight percent of a low boiling carbonaceous material obtained from the liquefaction of coal having a softening point between 50° and 150° C. which has been freed of solid, non-melting components.

2. A synthetic plastic composition according to claim 1, containing a softener.

3. A synthetic plastic composition according to claim 2 wherein said softener is a mineral oil or an aryl ester.

4. A synthetic plastic composition according to claim 1 containing a filler.

5. A synthetic plastic composition according to claim 4 wherein said low boiling carbonaceous material and said filler comprise 40 to 80 weight percent of the total composition.

6. A synthetic plastic composition according to claim 1 wherein said elastomeric compound comprises 20 to 40 weight percent of the total composition.

7. A synthetic plastic composition according to claim 1 wherein the elastomeric component is a mixture of elastomeric compounds.

* * * * *